April 26, 1966 P. L. POWELL 3,247,724
ADJUSTABLE MOUNTING AND BIAS FOR AN INSTRUMENT SHAFT
Filed July 10, 1963
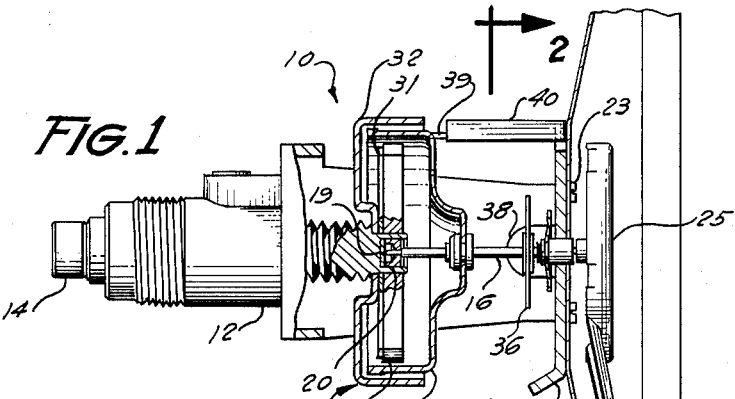
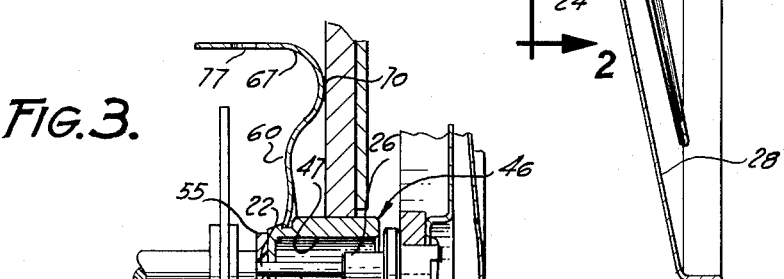
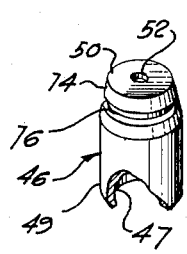
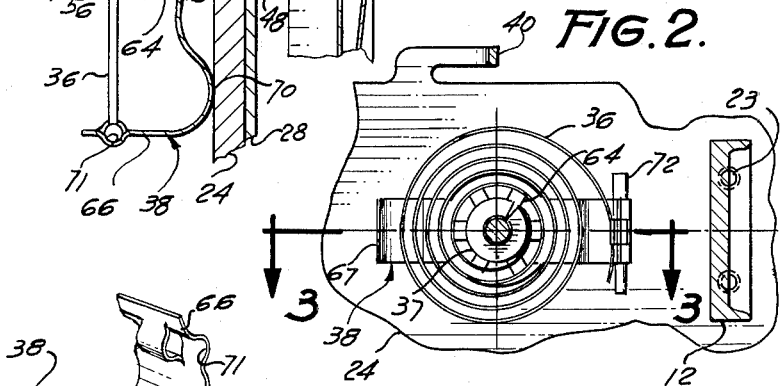
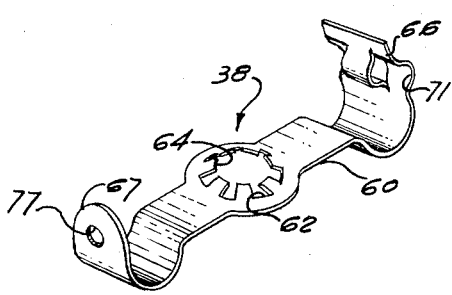
INVENTOR
Patrick L. Powell
By A. G. Douvas
Attorney

United States Patent Office 3,247,724
Patented Apr. 26, 1966

3,247,724
ADJUSTABLE MOUNTING AND BIAS FOR
AN INSTRUMENT SHAFT
Patrick L. Powell, Franklin Park, Ill., assignor to Stewart-Warner Corporation, Chicago, Ill., a corporation of Virginia
Filed July 10, 1963, Ser. No. 293,982
5 Claims. (Cl. 73—519)

This invention relates to adjustment mountings for a shaft, and more particularly, to mountings operable to adjust axial takeup between the thrust bearings of the shaft and to adjust the return hair spring torque on the shaft.

In any device involving moving parts, working clearance must be maintained between the parts to permit smooth low resistant operation. In production type equipment, the dimensions of the separate components are generally permitted to vary plus or minus permissive tolerances from a nominal dimension. Thus, upon assembling various components the accumulation of slight tolerance variations from the nominal dimension must be taken up to maintain the desired working clearances between the components.

An eddy current instrument, such as a tachometer, is a typical example of a device having separate production components assembled together and operated with close working clearances. Both the input or magnet shaft and the output or pointer shaft are supported by appropriate thrust and journal bearings to the instrument frame. On many designs, the output or pointer shaft is supported at one end in a bearing mounted on the input shaft to further compound possibility of accumulated dimensional variations. Conventionally, adjustment means are provided which compensate for these minor accummulation of tolerance variations.

Additionally, the output or pointer shaft of the instrument commonly does not rotate throughout a complete revolution but only oscillates a partial revolution from a zero output position. A hair spring is connected between the shaft and the frame to impose a slight return torque on the shaft tending to keep it in the zero output position. Adjustment means on the frame end of the hair spring adjust this torque to that required at the zero output position.

An object of this invention is to provide for a shaft an improved adjustment means that adjusts axial takeup between the thrust bearings on the shaft, that is economical in cost, and that can be assembled in an expedient manner.

Another object of this invention is to provide on a spring return shaft an improved adjustment means that adjusts the hair spring torque on the shaft, that is economical in cost, and that can be assembled readily.

In order that these objects can be more fully appreciated, reference is herein made to the accompanying drawing, wherein:

FIG. 1 is a side elevational view, partly in longitudinal center section, of a typical eddy current instrument employing as a part thereof the preferred embodiment of the subject invention;

FIG. 2 is an enlarged elevational view, partly in section, as seen generally from line 2—2 of FIG. 1;.

FIG. 3 is an enlarged sectional view as seen from line 3—3 of FIG. 2 of the preferred embodiment of the subject invention;

FIG. 4 is a perspective view, partly broken away and in section, of the bushing member used in the subject invention; and FIG. 5 is a perspective view of the spring regulator used in the subject invention.

FIG. 1 shows the operating components of a typical eddy current instrument 10. The instrument 10 includes a frame 12 supporting a pair of shafts 14 and 16 which in turn support eddy current means 18. The shaft 14 (only the ends of which are shown in FIG. 1) is supported rotatably and axially by bearing means (not shown) within the frame 12. The shaft 14 is the input shaft of the instrument, it being adapted to be connected at its outer end to a flexible shaft or the like (not shown) and ultimately to some operating machine. The shaft 16 has its opposite ends 19 and 21 necked down and supported between journal and thrust bearings 20 and 22. The bearing 20 is mounted on the end of the shaft 14, while the bearing 22 is mounted on front plate 24 secured by screws 23 to the frame 12 of the instrument 10.

The end 21 of the shaft 16 projects past the bearing 22 and the front plate 24 and is connected to pointer means 25. In the embodiment shown the pointer means 25 includes a hub assembly 26 press-fit onto the necked end 21 of the shaft 16 and a stamped pointer 27 staked thereto. The pointer 27 thus rotates as a unit with the shaft 16 and by comparing its position relative to appropriate markings on dial face 28 is used to indicate the instantaneous operating position of the instrument.

The eddy current means 18 include a magnet 30, compensator 31 and an iron field plate 32 supported by shaft 14 to rotate as a unit with the shaft. A speed cup 34 of nonmagnetizable material, such as aluminum, is secured to shaft 16 and presents its side wall in adjacent spaced relation to and between the magnet 30 and compensator 31, and the field plate 32. There is no mechanical connection between the shafts 14 and 16 so that, apart from the eddy torque of eddy means 18 and/or the friction of bearing 20, the shafts are free to rotate independently of one another.

Upon clockwise rotation (as seen from the right of FIG. 1) of the shaft 14 and the accompanying rotation of the magnet 30, compensator 31 and field plate 32 an eddy torque is imposed on the speed cup 34 tending to rotate it and the shaft 16 in the same direction as the rotating shaft 14. The rotation of the shaft 16 is opposed by a spiral hair spring 36 (FIG. 3). The hair spring 36 is secured at one end to collar 37 crimped on the shaft 16 and at its opposite end to spring regulator 38 secured relative to the frame 12. Adjustment of the spring regulator 38 by rotation about the shaft 16 varies the torque resisting the eddy imposed torque on the shaft 16. Tab 39 on the speed cup 34 abuts the frame at 40 to limit the counterclockwise rotation (seen from the right of FIG. 1) of the shaft 16 when the shaft is under the sole influence of the hair spring 36.

The bearing 22 for the front end of shaft 16 is formed from a bushing member 46 supported within an opening 48 within front plate 24. The bushing 46 has a cylindrical side wall 49 defining an enlarged bore 47 and a rear wall 50 having therein a smaller centrally located opening 52. The necked down portion 21 of the shaft 16 projects through the bearing opening 52 to within the bore 47 of the bushing 46, where it is secured to the pointer hub 26. Washer 55 positioned on the necked down portion 21 of the shaft between the end wall 50 of the bushing and shoulder 56 on the shafts acts as a thrust bearing element between the shaft and the bushing.

The bushing 46 is slightly oversized of the opening 48 of the front plate and is adapted to be press-fit therein. The axial position of the end wall 50 from the front plate 24 and thus in turn from the bearing 20 can be varied merely by varying the extent that the bushing is press-fit into the opening. This takes up the play of the shaft between the thrust bearings 20 and 22.

The spring regulator 38 is shown in detail in FIGS. 2 and 5 and includes a narrow strip of spring material such as steel. The regulator 38 has a bowed intermediate portion 60 having therein an opening 62 defined at its smallest diameter, in part, by spaced radial spring fingers 64 projecting to within the opening. The opposite ends of the regulator are bent outwardly relative to the bow in the intermediate portion 60 and form opposing legs 66 and 67. The bowed backside of the regulator is adapted to bear as at 70 against the inside of the front plate 24. The leg 66 has a slotted opening 71 which is adapted to receive the frame end of the hair spring 36 and a drive pin 72 to hold the spring in place, as is conventional in the art. The bushing 46 is tapered as at 74 and has therein an annular groove 76. The spring fingers 64 of the regulator 38 are forced over the tapered end 74 and received into the groove 76. This positions the regulator 38 axially relative to the bushing 46, but permits rotation of the regulator relative to the bushing with the fingers 64 riding in the groove 76.

The distance between the bearing 20 and the front plate 24 can or often does vary because of the accumulation of tolerance variations in each of the separate components. These tolerances must be taken up to permit a close but not binding fit on the various moving parts such as pointer shaft 16. On assembly, the bushing 46 is advanced and press-fit into the opening 48 in the front plate 24 to a minimum given distance and the regulator 38 is thereupon snapped onto the projected tapered end 74 of the bushing. The ends 19 and 21 of the shaft 16 are inserted into the bearings 20 and 22 and the front plate 24 is secured by screws 23 to the frame 12. The axial position of the bushing 46 is adjusted to provide the proper play of the shaft relative to the bearings. The end of the hair spring 37 is secured to the spring regulator 38 by means of the tapered pin 72 so that the opposite ends of the hair spring are connected then to the shaft at collar 37 and to the frame through regulator 38. A conventional type tool (not shown) can be inserted into opening 77 in arm 67 to adjust the rotatable position of the spring regulator to vary the resisting torque on the shaft. The press-fit of the bushing 46 into the front plate 24 maintains the adjusted axial position of the bushing, while the frictional engagement 70 of the regulator 38 and front plate 24 maintains the adjusted rotatable position of the regulator. The pointer shaft 16 thus can be properly adjusted in a rapid and expedient manner by means of the economical structure disclosed herein.

While only a single embodiment of the subject invention has been shown, it is to be understood to those skilled in the art that various other designs are possible. Accordingly, it is desired that the invention be limited only by the scope of the claims hereinafter following.

What is claimed is:

1. An adjustable mounting arrangement, comprising the combination of a shaft, a frame structure, means to support the shaft rotatably relative to the frame structure, said frame structure including a nosed portion adjacent the shaft having therein an annular groove, a regulator composed of a strip of spring stock material, said regulator having an opening therein defined in part by radial spring fingers of size comparable to the dimensions of the groove and being adapted to be forced over the nosed portion of the frame structure until the spring fingers snap in place within the groove, whereat said regulator spaced from the opening is adapted to engage another portion of the frame structure frictionally to resist yieldably rotation of the regulator about the shaft, a spring, means to secure the opposite ends of the spring to the end of the spring regulator and to the shaft, and means to adjust the rotatable position of the spring regulator to vary the torsional force from the spring applied to the shaft.

2. In a shaft assembly having means including a bushing to support a shaft rotatably relative to a mounting plate, an adjustable mounting arrangement adapted to be connected operatively between the shaft and the mounting plate to establish a torque tending to resist rotation of the shaft from a given no output position, comprising a spiral hair spring, means to secure one end of the hair spring to the shaft, a spring regulator of generally resilient material, said regulator having opposed end arms spaced from one another and jointed by an intermediate portion bowed at its center in a direction toward the projecting ends of the arm, said intermediate portion having an opening defined in part by spring fingers extended into the opening defining the minimum diameter thereof, the end of the bushing adjacent the shaft and spaced from the mounting plate being tapered toward the shaft and having a groove therein of maximum radial dimension less than the minimum dimension of the opening defined by the spring fingers, said spring regulator being adapted to be forced onto the tapered end of the bushing until the spring fingers snap into the grooves so that the regulator and bushing are fixed together axially but can be rotated relative to one another, and whereat the intermediate portion engages the mounting plate at a location thereon radially spaced from the bushing to cause a light but yieldable friction force between the regulator and the mounting plate tending to hold the regulator relative to the plate, means at one of the ends of the regulator for securing the opposite free end of the spiral hair spring, and means at the opposite end of the regulator to permit adjustment of the rotatable position of the regulator to adjust the torsional force on the shaft.

3. In combination, a shaft, a bearing and a support at each of the opposite ends of the shaft, one of the supports having an opening therein disposed in general alignment with the shaft and adapted to receive in press-fit relationship the corresponding bearing, said last-mentioned bearing being press-fit into the opening in the support to various distances toward the opposite bearing operable to provide the proper distance axially of the shaft between the bearings, the inner end of one of the bearings having therein an annular groove, a spring regulator composed of a strip of spring stock material having an opening therein defined in part by resilient spring fingers of size comparable to the dimensions of the groove, the opening in said spring regulator receiving the one bearing until the spring fingers snap in place within the groove, whereat said regulator engages the one bearing and is stressed against the adjacent bearing support frictionally to resist yieldably rotation of the regulator about the shaft, a spiral spring, and means to attach the ends of the spiral spring to the spring regulator and to the shaft, so that the rotatable position of the regulator can be varied to vary the torsional resistance offered by the spring to the shaft.

4. An adjustable mounting arrangement, comprising the combination of a shaft, a first bearing structure to support one end of the shaft laterally and for shaft thrust toward the one end of the shaft, a mounting plate adjacent the other end of the shaft, the mounting plate extending transverse to the shaft and having an opening substantially larger than the dimension of the shaft aligned axially with the longitudinal center axis thereof, a bushing having an exterior periphery of size and contour comparable to that of the opening in the mounting plate and adapted to be press-fit therein, said bushing having therein a second bearing structure to support the other end of the shaft laterally and for shaft thrust toward the other end of the shaft, the end of the bushing adjacent the first bearing structure projecting past the mounting plate and having therein an annular groove, a spring regulator composed of a strip of spring stock material, said regulator having an opening therein defined in part by radial spring fingers of size comparable to the dimensions of the groove and being adapted to be forced over the projected end of the bushing until the spring fingers snap in place within the groove, whereat the end of said regulator spaced from the bushing is adapted to engage the mounting plate frictionally to resist yieldably rotation of the regulator about the bushing, a spiral spring, means to secure the opposite ends of the spring to the regulator spaced from the shaft and to the shaft, so that adjustment of the rotatable position of the regulator varies the torsional resistance offered by the spring to the shaft, and that adjustment by press-fitting to a greater or less extent the bushing through the opening in the mounting plate toward the first bearing structure takes up any axial play in the shaft between the first and second bearing structures.

5. For use with a shaft extending through a plate and biased into a predetermined angular position by means of a spiral torsion spring having one end connected to said shaft, the improvement comprising a bushing in said plate for rotatably carrying said shaft, a spring regulator connected to the other end of said spring and stressed between a peripheral portion of said bushing and a portion of said plate in any one of a plurality of angular positions to frictionally engage said plate for enabling stable adjustment of the angular position of said regulator in any one of said positions.

References Cited by the Examiner

UNITED STATES PATENTS

| | | | |
|---|---|---|---|
| 1,467,031 | 9/1923 | Fisher | 73—519 |
| 1,714,268 | 5/1929 | Jones | 308—135 |
| 1,760,857 | 5/1930 | Berg | 73—498 |
| 1,816,581 | 7/1931 | Helgeby | 73—498 X |
| 1,962,538 | 6/1934 | Toney | 73—519 X |
| 2,073,152 | 3/1937 | Helgeby | 73—519 |
| 2,401,839 | 6/1946 | Norman | 73—519 |
| 2,445,638 | 7/1948 | Saks | 267—1 |
| 2,890,416 | 6/1959 | Walker | 324—154 |
| 3,011,351 | 12/1961 | Bergsma | 73—519 |

RICHARD C. QUEISSER, *Primary Examiner.*

JAMES J. GILL, *Examiner.*